(12) United States Patent
Collier et al.

(10) Patent No.: US 8,715,602 B2
(45) Date of Patent: May 6, 2014

(54) LOW TEMPERATURE HYDROCARBON SCR

(75) Inventors: Jillian Elaine Collier, Reading (GB); Philip Gerald Blakeman, Cambridge (GB); Isabel Zoe Tingay, Cambridge (GB); Paul James Millington, Reading (GB); Raj Rao Rajaram, Slough (GB); Andrew Peter Walker, Chester Springs, PA (US)

(73) Assignee: Johnson Matthey Public Limited Company, London (GB)

( * ) Notice: Subject to any disclaimer, the term of this patent is extended or adjusted under 35 U.S.C. 154(b) by 422 days.

(21) Appl. No.: 12/439,420

(22) PCT Filed: Jan. 12, 2007

(86) PCT No.: PCT/GB2007/050013
§ 371 (c)(1),
(2), (4) Date: Feb. 27, 2009

(87) PCT Pub. No.: WO2008/026002
PCT Pub. Date: Mar. 6, 2008

(65) Prior Publication Data
US 2009/0255236 A1    Oct. 15, 2009

(30) Foreign Application Priority Data
Aug. 30, 2006  (GB) ................... 0617070.8

(51) Int. Cl.
*B01D 53/56* (2006.01)
*B01D 53/90* (2006.01)
(52) U.S. Cl.
USPC .................. 423/239.2; 423/213.2; 423/213.5
(58) Field of Classification Search
USPC ............... 422/171, 172, 177, 111; 423/213.2, 423/213.5, 239.1, 239.2
See application file for complete search history.

(56) References Cited

U.S. PATENT DOCUMENTS

| | | | |
|---|---|---|---|
| 4,031,185 A * | 6/1977 | Akimoto et al. | 423/239.1 |
| 4,961,917 A | 10/1990 | Byrne | |
| 5,776,423 A * | 7/1998 | Feeley et al. | 423/239.2 |
| 5,965,098 A | 10/1999 | Boegner et al. | |
| 6,182,443 B1 * | 2/2001 | Jarvis et al. | 60/274 |
| 7,254,939 B2 * | 8/2007 | Duvinage et al. | 60/286 |
| 2003/0072694 A1 | 4/2003 | Hodgson et al. | |
| 2006/0263285 A1 * | 11/2006 | Pollington et al. | 423/239.1 |
| 2007/0081934 A1 * | 4/2007 | Hubig et al. | 423/239.1 |

FOREIGN PATENT DOCUMENTS

| | | |
|---|---|---|
| DE | 196 06 657 C1 | 7/1997 |
| EP | 0 341 832 A2 | 11/1989 |
| EP | 0 560 991 A1 | 9/1993 |
| EP | 1 054 722 B1 | 11/2000 |

(Continued)

OTHER PUBLICATIONS

English translation of Office Action for corresponding Japanese Patent Application 2009-526180 dated May 11, 2012.

(Continued)

*Primary Examiner* — Jill Warden
*Assistant Examiner* — Joye L Woodard
(74) *Attorney, Agent, or Firm* — RatnerPrestia

(57) ABSTRACT

A method of reducing nitrogen oxides ($NO_x$) in a flowing combustion exhaust gas to $N_2$, which method comprising oxidizing nitrogen monoxide to nitrogen dioxide on a transition metal/elite catalyst at catalyst bed temperatures below 50° C. and reducing $NO_x$ with the catalyst using an hydrocarbon (HC) reductant at catalyst bed temperatures below 150° C.

15 Claims, 7 Drawing Sheets

(56) References Cited

FOREIGN PATENT DOCUMENTS

| | | |
|---|---|---|
| EP | 1 057 519 B1 | 12/2000 |
| EP | 1 243 766 A2 | 9/2002 |
| EP | 1 243 766 A3 | 9/2002 |
| EP | 1 276 549 B1 | 1/2003 |
| JP | 4-284825 | 10/1992 |
| WO | WO-03/056150 A2 | 7/2003 |
| WO | WO-2004/094045 A1 | 11/2004 |
| WO | 2005075059 A1 | 8/2005 |
| WO | WO-2005/088091 A1 | 9/2005 |

OTHER PUBLICATIONS

Masakazu Iwamoto et al, "Removal of Nitrogen Monoxide through a Novel Catalytic Process. 1. Decomposition on Excessively Copper Ion Exchanged ZSM-5 Zeolites," *J. Phys. Chem.* 1991; 95, pp. 3727-3730.

Hai-Ying Chen et al., "Activity and durability of Fe/ZSM-5 catalysts for lean burn $NO_x$ reduction in the presence of water vapor," *Catalysis Today* 42, 1998, pp. 73-83.

Hai-Ying Chen et al., "Promoted Fe/ZSM-5 catalysts prepared by sublimation: de-$NO_x$ activity and durability in $H_2O$-rich streams," *Catalysis Letters* 50, 1998, pp. 125-130.

Xiaobing Feng et al., "FeZSM-5: A Durable SCR Catalyst for $NO_x$ Removal from Combustion Streams," *Journal of Catalysis* 166, 1997, pp. 368-376.

W. Keith Hall et al., "Problems in preparation of FeZSM-5 catalysts," *Catalysis Letters* 52, 1998, pp. 13-19.

Frank Heinrich et al., "Fe-ZSM-5 Catalysts for the Selective Reduction of NO by Isobutane—The Problem of the Active Sites," *Journal of Catalysis* 212, 2002, pp. 157-172.

Juan O. Petunchi et al., "Studies of a CuY Zeolite as a Redox Catalyst," *Journal of Catalysis* 80, 1983, pp. 403-418.

S. Kasaoka et al., "Effect of Inlet $NO/NO_2$ Molar Ratio and Contribution of Oxygen in the Catalytic Reduction of Nitrogen Oxides with Ammonia," *Nippon Kagaku Kaishi* 1978, No. 6, pp. 874-881.

Hai-Ying Chen et al., "Reduction of $NO_x$ over Fe/ZSM-5 Catalysts: Adsorption Complexes and Their Reactivity toward Hydrocarbons," *Journal of Catalysis* 180, 1998, pp. 171-183.

H.-Y. Chen et al., "Reduction of $NO_x$ over Fe/ZSM-5 catalysts: mechanistic causes of activity differences between alkanes," *Catalysis Today* 54, 1999, pp. 483-494.

Hai-Ying Chen et al., "Reaction Intermediates in the Selective Catalytic Reduction of $NO_x$ over Fe/ZSM-5," *Journal of Catalysis* 186, 1999, pp. 91-99.

Xiaobing Feng et al, "On the unusual stability of overchanged FeZSM-5," *Catalysis Letters* 41, 1996, pp. 45-46.

Timur V. Voskoboinikov et al, "On the nature of active sites in Fe/ZSM-5 catalysts for $NO_x$ abatement," *Applied Catalysis B: Environmental* 19, 1998, pp. 279-287.

\* cited by examiner

LOW TEMPERATURE HYDROCARBON SCR

CROSS-REFERENCE TO RELATED APPLICATIONS

This application is the U.S. National Phase application of PCT International Application No. PCT/GB2007/050013, filed Jan. 12, 2007, and claims priority of British Patent Application No. 0617070.8, filed Aug. 30, 2006, both of which are incorporated herein by reference.

FIELD OF THE INVENTION

The present invention relates to a system for and method of selectively catalysing the reduction of $NO_x$ in combustion exhaust gas to $N_2$ with an hydrocarbon reductant and in particular it relates to a system for and method of selectively catalysing such reaction at relatively low temperatures.

BACKGROUND OF THE INVENTION

In selective catalytic reduction (SCR) of $NO_x$ by hydrocarbons (HCs) (referred to herein as HC-SCR), HCs are reacted with $NO_x$, rather than with oxygen, to form nitrogen, $CO_2$ and water according to reaction (1):

$$\{HC\} + NO_x \rightarrow N_2 + CO_2 + H_2O \quad (1)$$

Some nitrous oxide ($N_2O$) may also be formed in reaction (1).

The competitive, undesirable non-selective reaction with oxygen is given in reaction (2):

$$\{HC\} + O_2 \rightarrow CO_2 + H_2O \quad (2)$$

HC-SCR catalysts are also referred to as "lean $NO_x$ catalysts" (LNC) or "$DeNO_x$ catalysts".

Whilst conversion can be improved if the exhaust gas has a relatively low oxygen content, many combustion exhaust gases produced by lean-burn internal combustion engines have relatively high oxygen content, typically 5-10% in the case of diesel exhaust gas.

"$C_1$ HC" as used herein is not a reference to methane or some other hydrocarbon species having only one carbon atom. Rather, it is an expression adopted by researchers in the field to equate concentrations of hydrocarbon reductants so that conditions can be compared no matter whether, for example, iso-butane ($C_4H_8$) or propene ($C_3H_6$) reductant is used. For example, iso-butane is $C_4$ and so its $C_1$ concentration will be four times that of iso-butane per se, whereas propene is $C_3$ and so its $C_1$ concentration will be three times that of propene per se.

A commonly quoted HC-SCR catalyst is copper-exchanged elite, such as Cu/ZSM-5 (see Iwamoto, M., et al., 1991. "Removal of Nitrogen Monoxide through a Novel Catalytic Process", Journal of Physical Chemistry, 95, pg. 3727-3730), which is active at relatively high temperatures, between about 350 and 500° C. However, the experimental conditions in the laboratory did not include $H_2O$ or $SO_2$ which are ubiquitous components of combustion exhaust gas and subsequently they were found to inhibit $NO_x$ reduction.

Fe/ZSM-5 catalysts have also been studied in the laboratory, but the preparation route for the most active reported catalysts is complicated. Chen and Sachtler (Catalysis Today, 42, (1998) 73-83) obtained a Fe/ZSM-5 catalyst with Fe/Al~1 by chemical vapour deposition (sublimation) of $FeCl_3$ onto H-ZSM-5 and compared its activity with Fe/ZSM-5 prepared by ion exchange in an aqueous slurry using $FeSO_4$ precursor. In the range 250-500° C. considered, the Fe/ZSM-5 catalyst prepared by sublimation was found to have a 75% NO conversion at about 350° C. when iso-butane was the reductant, whereas the best conventionally prepared catalysts showed a peak conversion of about 55% at 350° C. Activity of their more active catalyst was found to be unimpaired at high temperature in the presence of 10% $H_2O$ (Catalysis Letters 50 (1998) 125-130).

Chen and Sachtler also reported difficulty in repeating the procedure of Feng and Hall (described by the latter pair in J. Catal. 166 (1997) 368) for the preparation of "overexchanged" Fe/ZSM-5 catalysts from $FeC_2O_4 \cdot 2H_2O$, which was said to minimise oxidation of $Fe^{2+}$ to $Fe^{3+}$ and precipitation of FeOOH and $Fe(OH)_3$ while maintaining the pH in the range 5.5<pH<7.0. Feng and Hall had reported achieving 100% conversion between 450 and 550° C. using iso-butane as reductant with their overexchanged Fe/ZSM-5. However, more recently, Feng and Hall reported that neither the initial "overexchanged" catalysts nor their results could be reproduced (Catal. Lett. 52 (1998) 13-19) (about 60% NO conversion with iso-butane at a $T_{max}$ of 425° C.) the originally observed activity being explained by some unknown property of the zeolite sample used to prepare the catalysts.

More recent investigations into Fe-ZSM-5 HC-SCR catalysts have looked at catalysts prepared by solid state ion exchange and chemical vapour deposition and concluded that an extensive washing step prior to calcination plays a key role in catalyst activity (see Heinrich et al., Journal of Catalysis, 212, 157-172 (2002)). Analysis of catalyst activity was carried out at between 523 and 823 Kelvin (250-550° C.) using iso-butane as reductant.

Fe/Y elite (FeY) was also studied as a potential redox catalyst using inter alia CO/NO as a model to compare with the activity of Cu/Y elite at 300° C. (see J. O. Petunchi et al. Journal of Catalysis, 80, 403-418 (1983)).

Some transition metals/zeolites are also known for catalysing the reduction of $NO_x$ to $N_2$ with $NH_3$ reductant. See for example U.S. Pat. No. 4,961,917 (iron/beta elite).

Due to the selective character of reaction (1) (in practice, the maximum selectivity of HC-SCR catalysts in an exhaust system of a diesel engine is limited to about 20%, i.e., 20% of HC reacts with $NO_x$ and 80% with oxygen), HC-SCR catalysts show increasing $NO_x$ conversion rates with increasing hydrocarbon concentrations ($C_1$ HC to $NO_x$ mole ratios between 3 and 12 are usually used in laboratory evaluations, with higher ratios resulting in better $NO_x$ conversion). The limited supply of native diesel hydrocarbons (which is actually quite low in comparison to the $NO_x$ emission levels: $C_1$ HC to $NO_x$ in native diesel exhaust is typically below 1) may constitute a barrier in achieving higher $NO_x$ conversions, especially if the catalyst selectivity is low. Actively enriching the exhaust gases with additional HC material has been perceived as a solution to this problem. In general, such enrichment could be realized by two methods:

(i) injection of hydrocarbons, preferably diesel fuel, into the exhaust system upstream of the catalyst; or (ii) late in-cylinder injection using common rail fuel injection, or merely late injection timing in conventional fuel injection systems.

Exhaust systems with exhaust gas HC enrichment have been termed "active" systems. To distinguish from such active systems, exhaust systems in which HC-SCR is achieved exclusively using unburned hydrocarbons in native exhaust gas are often referred to as "passive" HC-SCR systems. Active HC enrichment does involve a certain fuel economy penalty, depending on the quantity of injected fuel. An additional oxidation catalyst may also be necessary in the active configurations to oxidize hydrocarbons which may pass through (or "slip") the HC-SCR catalyst.

Known methods of reducing $NO_x$ in lean exhaust gas from internal combustion engines include HC-SCR catalysts, such as platinum on an alumina support, Cu/elite and silver on an alumina support; $NH_3$ SCR (see e.g. U.S. Pat. No. 4,961,917); or $NO_x$ storage catalysts ($NO_x$ traps)—see for example EP 560991. However, a problem with each of these techniques is that none is known to be active for reducing $NO_x$ at temperatures below 150° C.

Emissions standards such as the FTP for light-duty diesel vehicles set a limit on the level of exhaust gas components CO, HC, $NO_x$ and particulate matter (PM) it is permissible to emit over the course of a standard test cycle. Such emission test cycles include emissions released immediately after the engine is switched on (often referred to as "cold start") and since known catalytic methods of removing $NO_x$ are not active until the catalyst temperature rises sufficiently, the period between cold start and the onset of catalytic activity promoting $NO_x$ reduction can contribute greatly to the overall $NO_x$ emissions over the whole cycle.

WO 2004/094045 discloses a method of decomposing nitrogen dioxide to nitrogen monoxide in an exhaust gas of a lean burn internal combustion engine, such as a diesel engine, comprising adjusting the $C_1$ hydrocarbon:nitrogen oxides ($C_1$ HC:$NO_x$) ratio of the exhaust gas to from 0.1 to 2 at above 250° C. and contacting this exhaust gas mixture with a particulate acidic refractory oxide selected from the group consisting of zeolites, tungsten-doped titania, silica-titania, zirconia-titania, gamma-alumina, amorphous silica-alumina and mixtures of any two or more thereof and passing the effluent gas to atmosphere. The particulate oxide may support a metal or a compound thereof including copper or iron.

WO 2005/088091 discloses a method of reducing $NO_x$ in exhaust gas flows of a motor vehicle, by means of a catalyst, characterised in that a $NO_x$ absorbing material is provided in the catalyst. In one embodiment, the $NO_x$ absorbing material is a elite, optionally containing oxidative metallic ions including copper and/or iron. It is suggested that a elite containing metallic ions can also oxidise NO to $NO_2$ in addition to absorbing $NO_x$. The method includes absorbing NO at temperatures≤20° C. and desorbing NO at increasing (unspecified) temperatures. Regions for oxidising NO can be combined with regions for reducing $NO_x$. Such reducing regions comprise clay minerals such as bentonite, sepiolite, hectorite and montmorillonite, preferably containing basic cations such as Ba, Na, Sr, Ca and Mg to bind hydrocarbons and convert them to more reactive species, such as aldehydes. $NO_x$ reductants such as HC, CO/$H_2$ or ammonia are disclosed. However, so far as it can be understood, the disclosure does not mention any temperatures at which the reductants are brought into contact with the catalyst. Furthermore, there are no Examples to enable the skilled person to ascertain how some of the more impressive alleged advantages are obtained, e.g. a minimum 52% $NO_x$ reduction relative to prior art engines.

JP 04-284825 discloses a method of reducing NO in an exhaust gas to $N_2$ at above 300° C. by introducing hydrocarbons having a carbon number from 2-7 into the exhaust gas and contacting the resulting exhaust gas mixture with a metal-containing elite (metals including copper, manganese, cobalt, iron, nickel, chromium and vanadium).

SUMMARY OF THE INVENTION

We have now discovered, very surprisingly, a means of reducing nitrogen oxides in relatively cool exhaust gas conditions, e.g. below 150° C., such as below 140° C., below 130° C., below 120° C., below 110° C., below 100° C., below 90° C., below 80° C., below 70° C. or below 60° C. This discovery has particular application to the treatment of $NO_x$ in the period immediately after a lean burn internal combustion engine is first turned over (known as "cold start"), which cold start $NO_x$ would otherwise contribute to the overall total $NO_x$ emissions over a legislated drive cycle.

According to one aspect, the invention provides a method of reducing nitrogen oxides ($NO_x$) in a flowing combustion exhaust gas to $N_2$, which method comprising oxidising nitrogen monoxide (NO) to nitrogen dioxide ($NO_2$) on a transition metal/elite catalyst at catalyst bed temperatures below 50° C. and reducing $NO_x$ with the catalyst using an hydrocarbon (HC) reductant at catalyst bed temperatures below 150° C.

In one embodiment, the HC reductant is adsorbed on the catalyst prior to contacting the flowing combustion gas.

In another embodiment, the HC reductant is present in the exhaust gas at >50 ppm $C_1$ HC, such as >100 ppm $C_1$ HC, >200 ppm $C_1$ HC or even >500 ppm $C_1$ HC. One reason for this limitation is purposively to distinguish between exhaust gases produced passively by current diesel engines during normal operating conditions (which normal operating conditions exclude transient HC "spikes" caused e.g. by hard acceleration), but to embrace engines that may come into service in the future, such as HCCI engines. However, the >50 ppm $C_1$ HC reductant present in the exhaust gas may also be introduced actively into the exhaust gas. For the avoidance of doubt, the method and system according to the present invention embraces both passive and active modes of bringing HC reductant into contact with the transition metal/elite catalyst.

In one embodiment, the method of the present invention comprises adsorbing NO on the catalyst prior to the step of oxidising the NO to $NO_2$.

BRIEF DESCRIPTION OF THE DRAWINGS

In order that the invention may be more fully understood an embodiment will now be described with reference to the accompanying drawings, in which.

DETAILED DESCRIPTION OF THE INVENTION

Figure 1:
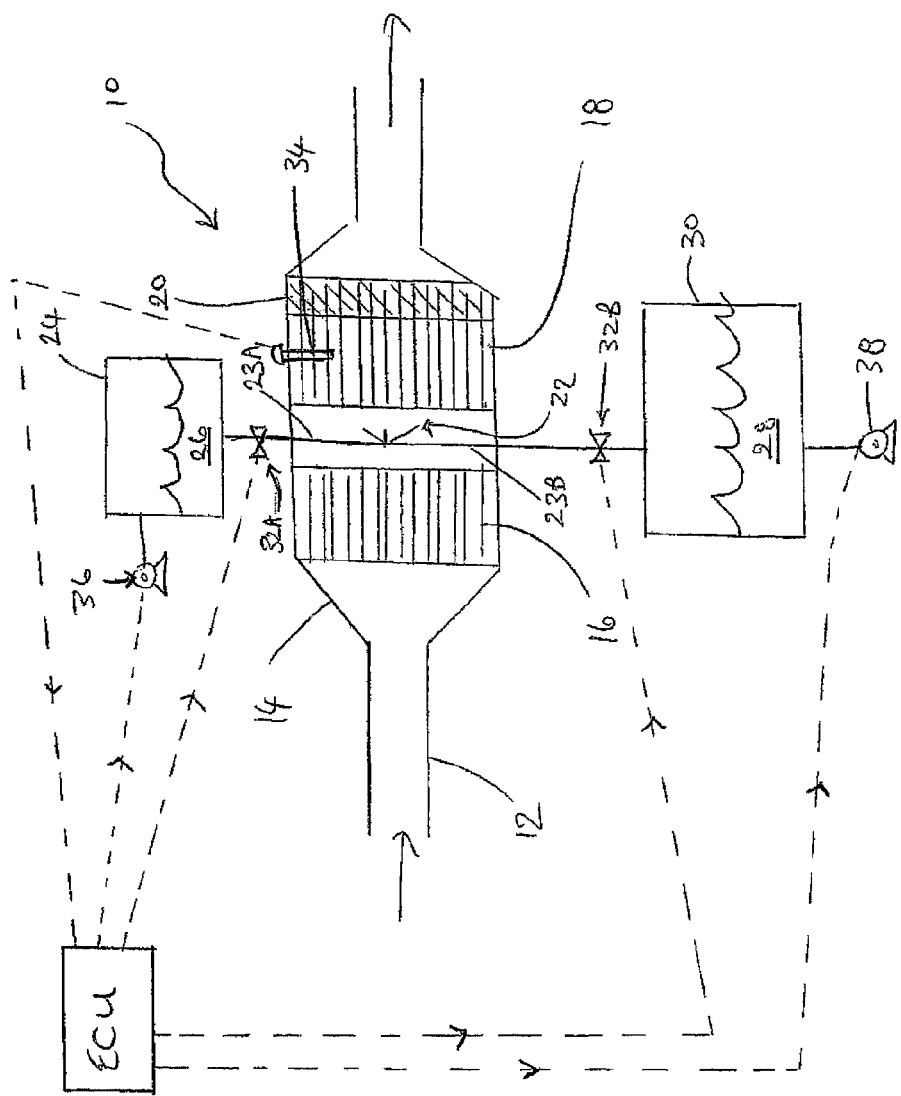
FIG. 1 is a schematic representation of an exhaust system according to the present invention.

According to our investigations (set out in the Examples below), NO oxidation may be preceded by adsorption of NO on a catalyst surface. In particular, we believe that such adsorption comprises physical trapping of NO in the elite structure, as opposed to chemical absorption in a $NO_x$ absorber component of a $NO_x$ trap (see EP 0560991), wherein a new chemical compound, such as barium nitrate, is formed from the $NO_x$. Our experiments suggest that concentration of NO in the elite structure promotes NO dimerisation (oxidation) at catalyst bed temperatures below 50° C. in the absence of transition metal.

Furthermore, the experiments suggest that reduction of $NO_x$ may be preceded by some $NO_2$ or NO release. Without wishing to be bound by any theory, we believe that the observed $NO_2$ release could be due to one or more of: $NO_2$ desorption preceding $NO_x$ reduction; $NO_2$ being displaced from the catalyst surface by HC; and $NO_2$ being released coincidentally with HC-SCR taking place.

Furthermore, our experiments suggest that $NO_x$ reduction at catalyst bed temperatures below 150° C. occurs at the active transition metal sites, so $NO_2$ may migrate to the active transition metal sites either through the elite structure or be desorbed from the elite structure and readsorbed at the active transition metal sites.

So, our experiments seem to show that the method of the present invention comprises a two step process, wherein a first step comprises NO adsorption at catalyst bed temperatures below 50° C. and a second step comprises $NO_x$ reduction at active transition metal sites at higher temperatures than the NO adsorption step, but below 150° C.

Since $NO_2$ may be present in the exhaust gas per se, e.g. derived from a combustion process in an engine, it is possible that some $NO_2$ is adsorbed on the catalyst directly from the exhaust gas. Hence, $NO_2$ adsorbed on the catalyst surface may be a combination of $NO_2$ derived from oxidation of NO and $NO_2$ adsorbed from the exhaust gas as $NO_2$ per se. Furthermore, some $NO_2$ reduced to $N_2$ in the method according to the invention may be from the exhaust gas, i.e. it may not have been desorbed from the catalyst surface.

In the absence of hydrocarbon, $NO_x$ adsorbed on a elite catalyst at relatively low temperatures is known to be emitted as $NO_2$ at higher temperatures as NO is oxidised on the elite in the absence of $H_2O$ (the so-called Wisconsin Process). What we do not believe is known is that the release of $NO_2$ can be suppressed by contacting the elite/adsorbed $NO_x$ with an hydrocarbon. Most surprising, however, is the discovery that where the elite contains a transition metal such as iron (e.g. exchanged or impregnated), the suppression of $NO_2$ is associated with $NO_x$ reduction, i.e. HC-SCR.

(According to the disclosure, a catalyst is active for HC-SCR if it catalyses the reduction of $NO_x$ to $N_2$ in a SCAT reactor using conditions set out in Example 5 using Fourier Transform infrared mass balance analysis at >10% $NO_x$ unaccounted for).

Since certain transition metal/elite catalysts such as Fe/elite are known $NH_3$-SCR catalyst, our discovery opens up the exciting possibility of performing HC-SCR in a system at relatively low temperatures, and $NO_x$ reduction by $NH_3$-SCR at higher temperatures. Such transition metals can include cobalt, manganese, cerium, chromium, copper and iron. However, it is known that in Japan there is a voluntary ban on the use of copper, cobalt, nickel, manganese, chromium and vanadium. Accordingly, in one embodiment, these metals are removed from the list of available transition metals for use in the invention.

The $C_1$ HC:adsorbed $NO_x$ molar ratio in the method of the invention is selected to promote a desired $NO_x$ conversion. In one embodiment, the $C_1$ HC:adsorbed $NO_x$ molar ratio is 30:1 to 1:1. It will be appreciated, however, that the higher ratios may result in an excessive fuel penalty. However, it is believed that the invention extends to such higher ratios particularly for embodiments wherein the HC reductant is adsorbed on the catalyst prior to the step of adsorbing $NO_x$ on the catalyst. In further embodiments, the $C_1$ HC:NOX ratio can be from 20:1, such as 12:1, 10:2 or 8:3, for example.

We have found that NO oxidation and/or $NO_x$ adsorption from exhaust gases on a transition metal/elite catalyst for use in the present invention generally occurs on transition metal/elite catalysts at temperatures below 50° C., such as below 40° C. or even below 30° C. It follows that if the ambient temperature of, for example, a vehicle is 25° C. when the engine is turned over, that the total molar $NO_x$ adsorbed may be less than if the ambient temperature were 0° C., since in the latter case there is a greater opportunity for net NO oxidation and/or $NO_x$ adsorption before the catalyst temperature is sufficient for HC-SCR. Therefore, the ambient temperature at which $NO_x$ in the flowing exhaust gas first contacts the transition metal/elite may shift the $C_1$ HC:$NO_x$ ratio to higher values.

The step of reducing the $NO_x$ with HC on the transition metal/elite catalyst generally occurs at catalyst bed temperatures below 150° C. It is believed that there may be some overlap of the temperature ranges for NO oxidation and/or net $NO_x$ adsorption on the transition metal/elite and the onset of $NO_x$ reduction. However, our present understanding is that the HC-SCR activity is more closely associated with a temperature range at which NO oxidation occurs and/or $NO_2$ would be desorbed in the absence of HC, i.e. at temperatures above about 15° C., such as above about 20° C., 25° C., 30° C., 35° C., 40° C., 45° C. or 50° C.

The combustion exhaust gas can come from any source, but in one embodiment it is derived from combustion of an hydrocarbon fuel in a lean-burn internal combustion engine.

In one embodiment, the hydrocarbon reductant is already present in the exhaust gas contacting the catalyst, e.g. in exhaust gas flowing in an exhaust system following cold-start. In another embodiment, the hydrocarbon reductant is adsorbed on the catalyst prior to the step of adsorbing $NO_x$ on the catalyst.

In one embodiment, the transition metals for use in the present invention are each selected from the group consisting of cobalt, manganese, cerium, copper, iron, chromium and mixtures of any two or more thereof.

In another embodiment, the transition metals for use in the present invention comprises all transition metals except platinum or other platinum group metals.

The elite component of the transition metal/elite catalyst can be any suitable for the purpose, such as ZSM-5, mordenite, ferierite, silicalite, A, beta elite, X elite, Y elite, Linde type L or faujasite. Without wishing to be bound by any theory, we believe that elite materials having a higher silica-to-alumina ratio (SAR) will show increased $NO_x$ conversion. This is because the higher SAR zeolites may have more acid sites for $NO_2$ storage. The greater the capacity for $NO_2$ storage, the higher the expected conversion as the temperature increases. A preferred elite is beta elite. Transition metal loadings on the zeolites may be from 1-10 wt %, for example, based on the total weight of the catalyst as a whole.

The catalyst can be prepared by any method known in the art, including sublimation, solid state ion exchange, wet impregnation or ion exchange in an aqueous slurry. "Overexchanged" catalysts may also be used. That is, the method according to the invention appears to be active no matter what mode of manufacture is adopted, as opposed to many of the reports of HC-SCR activity at above 200° C. reported in the papers discussed hereinabove.

By "transition metal/elite" herein, we mean exchanged materials and materials obtained, e.g. by wet impregnation, wherein particles of a transition metal or a compound thereof, such as an oxide species after calcination, are present in the elite without necessarily being exchanged therewith. Of course, some transition metal exchanged materials may also contain the transition metal per se or compounds of the transition metal as well.

The transition metal/elite catalyst is typically coated onto a flow-through monolith (metal or ceramic), or is prepared as an extruded-type substrate, i.e. the transition metal/elite forms part of the material that forms the substrate per se. Alternatively, the transition metal-exchanged elite catalyst can be coated onto a wall-flow filter, sintered metal filter or metallic partial filter (such as is described in EP 1276549) or a flow-through substrate providing a tortuous flow path rather than parallel channels, such as that which is described in EP 1057519. As used herein the term "substrate" shall include both flow-through monoliths and filters.

Any suitable hydrocarbon reductant may be used, but in a particular embodiment, it is diesel fuel, especially if the source of the combustion exhaust gas is a lean-burn internal combustion engine.

Since transition metal/zeolites are also known for reducing $NO_x$ to $N_2$ with suitable nitrogenous reductants, such as ammonia (see e.g. U.S. Pat. No. 4,961,917), one embodiment of the invention provides the step of extending the range of $NO_x$ reduction to a catalyst bed temperature $\geq 150°$ C. by switching the source of reductant from hydrocarbon to a nitrogenous reductant. The nitrogenous reductant may be derived from a precursor thereof, such as urea or ammonium carbamate. Of course, if the catalyst bed temperature were to drop to below 150° C. during a drive cycle or in transient driving, such as may occur during periods of extended idling and in slow-moving traffic, the source of reductant can be switched back to hydrocarbon. A further iteration of this embodiment comprises the step of oxidising at least a portion of NO in the exhaust gas to $NO_2$ before contacting the resulting exhaust gas with the transition metal/zeolite catalyst. This is in contradistinction to the method disclosed in WO 2005/088091 which, as far as it can be understood, discloses using a single reductant, i.e. there is no disclosure of switching between two dissimilar reductants in response to a detected catalyst bed temperature.

In another embodiment, the NO oxidation catalyst is sufficiently active to generate an exhaust gas comprising a mixture of $NO:NO_2$ of 2:1 to 1:2 or lower. An advantage of the latter embodiment is that a mixture of $NO:NO_2$ has been found to be more active for reducing $NO_x$ to $N_2$ using a nitrogenous reductant than either substantially all $NO_2$ or substantially all NO (see for example Nippon Kagaku Kaishi, 1978, No. 6, pp. 874-881).

According to a second aspect, the invention provides an exhaust system for treating $NO_x$ in a combustion exhaust gas flowing in the system, which system comprising a transition metal/elite catalyst for oxidising NO to $NO_2$ at catalyst bed temperatures below 50° C. and means, when in use, for contacting the catalyst with sufficient HC reductant to reduce $NO_x$ to $N_2$ at catalyst bed temperatures of below 150° C.

In one embodiment, the means, when in use, for contacting the catalyst with the HC reductant comprises means for contacting the catalyst with the HC reductant in the absence of flowing exhaust gas. However, in this embodiment, the transition metal/elite is arranged to receive all exhaust gas; no by-pass arrangement is implied.

In another embodiment, the means, when in use, for contacting the transition metal/elite catalyst with the HC reductant comprises an injector for injecting >50 ppm $C_1$ HC into exhaust gas flowing in the exhaust system, e.g. downstream of any engine exhaust manifold. In this embodiment, the hydrocarbon reductant should be available for contacting the transition metal/zeolite catalyst with the exhaust gas and so any injector for injecting hydrocarbon reductant into exhaust gas should not be located downstream of the transition metal/elite catalyst, i.e. the injector may be disposed upstream of the catalyst and/or arranged so as to spray hydrocarbon directly onto the catalyst.

In any embodiment, the means for contacting the catalyst with sufficient HC reductant can be configured, when in use, to provide a $C_1$ $HC:NO_x$ molar ratio of from 30:1 to 1:1.

In another embodiment, the exhaust system comprises means, when in use, for contacting the transition metal/elite catalyst with a nitrogenous reductant at a catalyst bed temperature of $\geq 150°$ C., thereby to reduce $NO_x$ in the exhaust gas to $N_2$. In a particular arrangement of this embodiment, a catalyst of sufficient activity that at least a portion of NO in the exhaust gas is oxidised to $NO_2$ is disposed upstream of the transition metal/elite catalyst. In the latter arrangement, where the exhaust system comprises an injector for injecting hydrocarbon reductant into exhaust gas flowing in a conduit of the system, in a particular embodiment, the injector is disposed between the oxidation catalyst and the transition metal/zeolite catalyst.

Where HC is to be injected into a flowing exhaust gas, it may be desirable to include a suitable mixer between the HC injector and the transition metal/zeolite catalyst to improve HC flow distribution and increase contact with the catalyst.

In another embodiment, the NO oxidation catalyst is sufficiently active to generate a mixture of $NO:NO_2$ of 2:1 to 1:2 or lower when conditions are favourable for $NO_x$ reduction of the transition metal/elite catalyst.

In further embodiments of the arrangement including the NO oxidation catalyst upstream of the transition metal/elite catalyst, a filter may be disposed between the oxidation catalyst and the transition metal/zeolite catalyst in an arrangement disclosed in our EP 0341832. The filter can be a wall-flow filter or a partial filter such as that disclosed in EP 1276549. In this case, the reductant injector can be located either between the NO oxidation catalyst and the filter (for improved mixing) or between the filter and the transition metal/zeolite catalyst.

Alternatively, HC can be injected into the exhaust system upstream of the NO oxidation catalyst. EP 1054722 describes an exhaust system comprising this combination and, in order, an NO oxidation catalyst, a filter, a reductant injector and a SCR catalyst. In such arrangements it is possible actively to regenerate the filter by injecting additional HC into the exhaust gas upstream of the NO oxidation catalyst in order to combust the injected HC on the NO oxidation catalyst, thereby increasing the temperature of the filter and combusting particulate matter trapped thereon. In one embodiment of the present invention the HC injector for providing the HC for reducing $NO_x$ is the HC injector for injecting HC into the exhaust gas upstream of the exotherm generating catalyst/NO oxidation catalyst for actively regenerating the filter.

Alternatively, the NO oxidation catalyst can be coated on the filter with the injector disposed between the filter and the transition metal/elite catalyst.

In order to prevent excess hydrocarbon reductant and, where present, nitrogenous reductant that slips past the transition metal/elite catalyst from being emitted to atmosphere, the exhaust system may comprise an oxidation catalyst for oxidising such components (also known as a "slip catalyst" or "clean-up catalyst"). Such slip catalysts can be coated onto the downstream end of the substrate supporting the transition metal/zeolite catalyst or on a separate substrate located downstream of the transition metal/elite catalyst.

According to a third aspect, the invention provides an apparatus comprising a lean-burn internal combustion engine and an exhaust system according to the invention. In a particular embodiment, the engine provides motive power for a mobile application such as a vehicle. However, the present invention may also find use in treating stationary source combustion gas.

In a particular embodiment, the engine is a diesel engine, but it may also be a lean-burn gasoline engine or an engine powered by liquid petroleum gas, natural gas, gas-to-liquids fuels, coal-to-chemicals fuels and biofuels. The hydrocarbon reductant for use in the invention may be the same as or different from the fuel that powers the engine.

In one embodiment, the means for contacting the catalyst with an HC reductant comprises the engine, e.g. an injector associated with one or more engine cylinder. When in use, hydrocarbon reductant may be introduced into the exhaust gas, e.g. by late in-cylinder injection in engines utilising common rail fuel injection or merely late injection timing in a conventional fuel injection system.

In one embodiment of the apparatus according to the invention, the means for contacting the catalyst with HC reductant, when in use, actively contacts the catalyst with HC to adsorb HC thereon prior to turning over the engine. A useful arrangement in this embodiment is for the exhaust system to comprise an injector for spraying hydrocarbon reductant directly onto the transition metal/elite catalyst.

We have found that the presence of water on the transition metal/zeolite catalyst can reduce activity of the catalyst and the overall $NO_x$ conversion. Water in the form of steam is a ubiquitous component of combustion exhaust gases, such as those from internal combustion engines. However, in practice the steam is likely to condense on the internal walls of the exhaust gas conduits or any catalyst substrates located upstream of the transition metal/zeolite catalyst before reaching the catalyst. However, in a further embodiment, to ensure that water is prevented from contacting the catalyst, a water trap may be disposed upstream thereof. Such water trap may comprise elite 5A, elite 3A, elite 4A or elite 13X, for example.

In another embodiment, particularly useful in the embodiment wherein hydrocarbon reductant is pre-adsorbed on the catalyst between switching off the engine and starting the engine, a water trap is located between the tail pipe exit to atmosphere and the catalyst in order to prevent ambient moisture from gaining access to the catalyst.

Referring to FIG. 1, an exhaust system 10 according to the invention comprises a conduit 12 for carrying a flowing exhaust gas e.g. of a lean burn internal combustion engine (not shown). Disposed within can 14 is oxidation catalyst 16 comprising an active component such as platinum on a high surface area alumina support material washcoated onto a ceramic flow through monolith substrate. A downstream ceramic flow through monolith substrate is coated with a Fe/beta elite catalyst 18 and the downstream end is coated with a platinum on alumina support slip catalyst 20 for oxidising hydrocarbon and ammonia to water and carbon dioxide and nitrogen oxides respectively. Injector 22 is disposed in the can between the oxidation catalyst 16 and the Fe/beta elite catalyst 18 and is supplied by separate lines 23A and B from a container 24 of hydrocarbon reductant 26, e.g. diesel fuel, and an ammonia precursor, urea, 28 contained in container 30, respectively. Flow of reductant in lines 23A and B is controlled by valves 32A and 32B respectively.

In practice, a signal detected by thermocouple 34 and representing a temperature of the Fe/beta elite catalyst 18 bed is fed back to the ECU which has been pre-programmed to control valves 32A and B and pumps 36 and 38 according to such temperature. In particular, when the bed temperature is below 150° C. valve 32B is maintained in a closed configuration and the rate of hydrocarbon injection via injector 22 is controlled by the ECU by varying the attitude of valve 32A and by controlling the rate of pump 36. At catalyst bed temperatures of >150° C., supply of hydrocarbon reductant to the exhaust gas flowing in the exhaust system is discontinued under control of the ECU by a combination of stopping pump 36 and closing valve 32A. At catalyst bed temperatures of >150° C., supply of urea 28 is commenced under control of the ECU by variable opening of valve 32B and control of pump 38. In order to decompose the urea to ammonia upstream of catalyst 32 it may be desirable to insert a suitable catalyst heated by the exhaust stream for hydrolysing the urea located between injector 22 and catalyst 18. Alternatively, or additionally, it is possible to hydrolyse the urea on a suitable heated catalyst upstream of injector 22; indeed this latter arrangement can reduce or prevent injector blocking.

EXAMPLES

In order that the invention may be more fully understood the following Examples are provided by way of illustration only.

Example 1

Method of Making Fe/beta Zeolite Catalyst

Commercially available beta elite was $NH_4+$ ion exchanged in a solution of $NH_4NO_3$, then filtered. The resulting material was added to an aqueous solution of $Fe_2(SO_4)_3$ with stirring. The slurry was filtered, then washed and dried. The procedure can be repeated to achieve a desired metal loading.

Example 2

Method of Making Cu/beta Zeolite

A Cu/beta elite of similar metal loading to that of the Fe/beta elite material of Example 1 was prepared as follows. Commercially available beta elite having a lower silica-to-alumina ratio than that of the beta-elite in the Example 1 material was $NH_4+$ ion exchanged in a solution of $NH_4NO_3$, then filtered. The resulting material was added to an aqueous solution of $CuSO_4$ with stirring. The slurry was filtered, then washed and dried. The procedure can be repeated to achieve a desired metal loading.

Example 3

Preparation of Monolith Cores

A washcoat of each of the catalysts prepared according to Examples 1 and 2 was prepared in a conventional manner by milling the catalyst powder, adding the catalyst powder to water and stirring the resulting slurry, raising the pH of slurry to 4 with $NH_3$ adding a commercially available rheology modifier with continued stirring, raising the pH to 7 with $NH_3$ and ageing the washcoat for 2-3 days prior to coating.

The washcoat was applied to a cordierite monolith by a proprietary coating technique and the resulting coated monolith was dried at 105° C. and calcined at 500° C. for 4 hours. Monolith cores were cut from the prepared monolith with a suitable tool.

Example 4

Fe/beta Zeolite and Unmetallized Beta Zeolite Powder SCAT Reactor Analysis 1 g of the Fe/beta elite powder catalyst obtained by the method of Example 1 (crushed and sieved to 255-350 μm) was exposed in a SCAT (synthetic catalytic activity test) reactor to a gas mixture of 2500 ppm NO, 12% $O_2$, 400 ppm CO, 4.5% $CO_2$, balance $N_2$ at 1 L/min gas at −8° C. (SV=14000 $h^{-1}$). The gas mixture was analysed on inlet (i.e. by-passing the catalyst) for 4 minutes and then on outlet (i.e. with the gas passing through the catalyst) for 5 minutes in a NO adsorption phase. The temperature was then ramped from −8° C. to 120° C. at 10° C./min in the same gas mixture.

Figure 2:
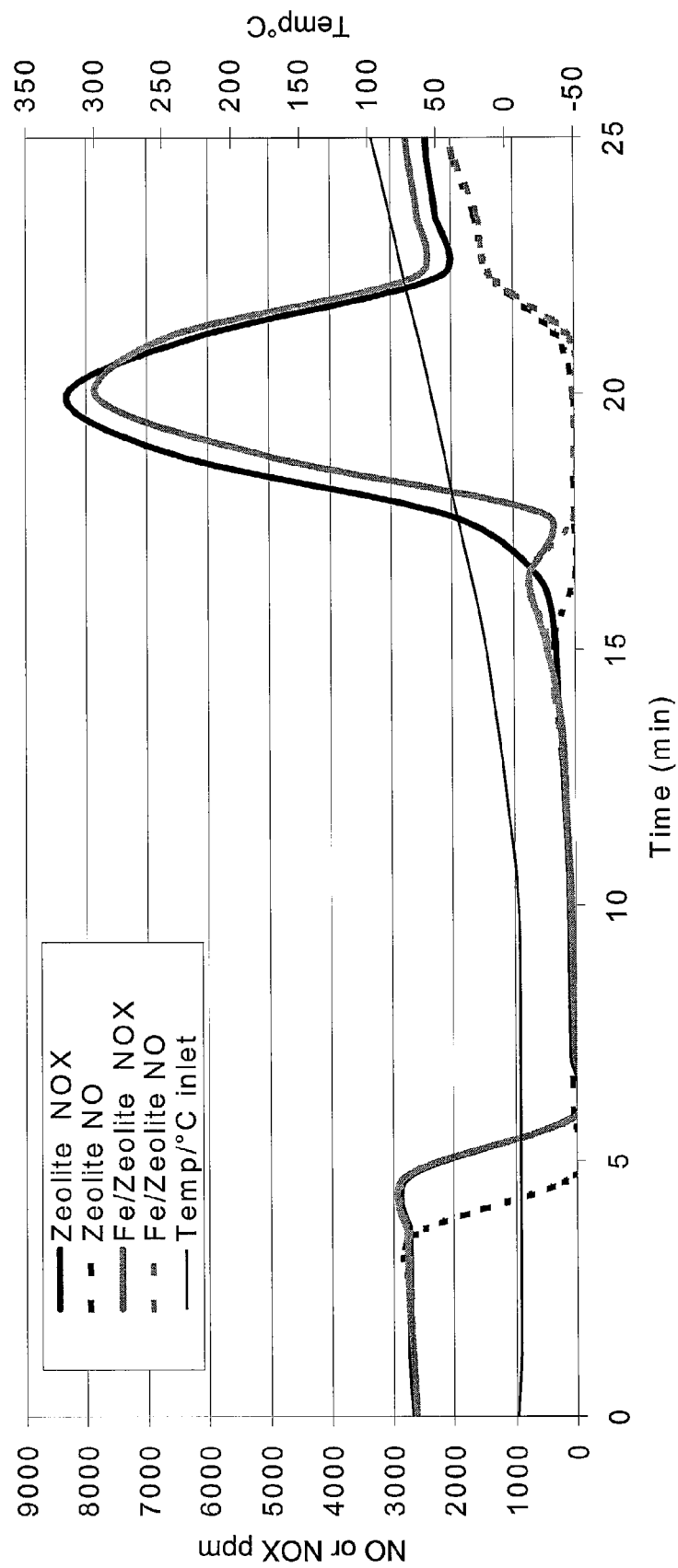
FIG. 2 is a chart showing reversible adsorption of $NO_x$ on unmetallised zeolite and a Fe/beta zeolite catalyst powder samples with rising temperature.

The results are shown in FIG. 2, from which it can be seen that at an exhaust gas temperature of −8° C., the inlet $NO_x$ composition of the exhaust gas is 100% NO (2500 ppm $NO_x$, left-hand axis). However, only about 500 ppm NO is emitted at the catalyst outlet. This observation suggests that the NO is being adsorbed on the elite. As the inlet gas temperature begins to rise, a spike of $NO_x$ is observed in both samples, which can be attributed to $NO_2$ (in a vehicular diesel engine, $NO_2$ concentrations in the exhaust gas are expected to be very low at cold-start) since there is no coincident NO spike. It is believed that the $NO_2$ is formed as a product of the high concentration of stored NO being oxidised on the catalyst in the absence of $H_2O$. This phenomenon is known from industrial processes, e.g. the Wisconsin Process. The fact that the $NO_2$ peak is observed with both the un-metallised elite and the Fe/beta elite shows that the metal in the iron/elite is not responsible for the evolution of the $NO_2$.

Example 5

Monolith Core SCAT Reactor and FTIR Analysis

A monolith core (15 mm diameter×30 mm long) obtained according to the procedure of Example 3, washcoated with Fe/beta elite prepared according to Example 1 was exposed in a SCAT reactor to the same gas mixture under the same conditions as described in Example 4. The monolith was then cooled to −8° C. off-line and the process repeated, but this time with 5000 ppm HC as $C_1$ ($C_3H_6$) present in the feedstock.

Figure 3:
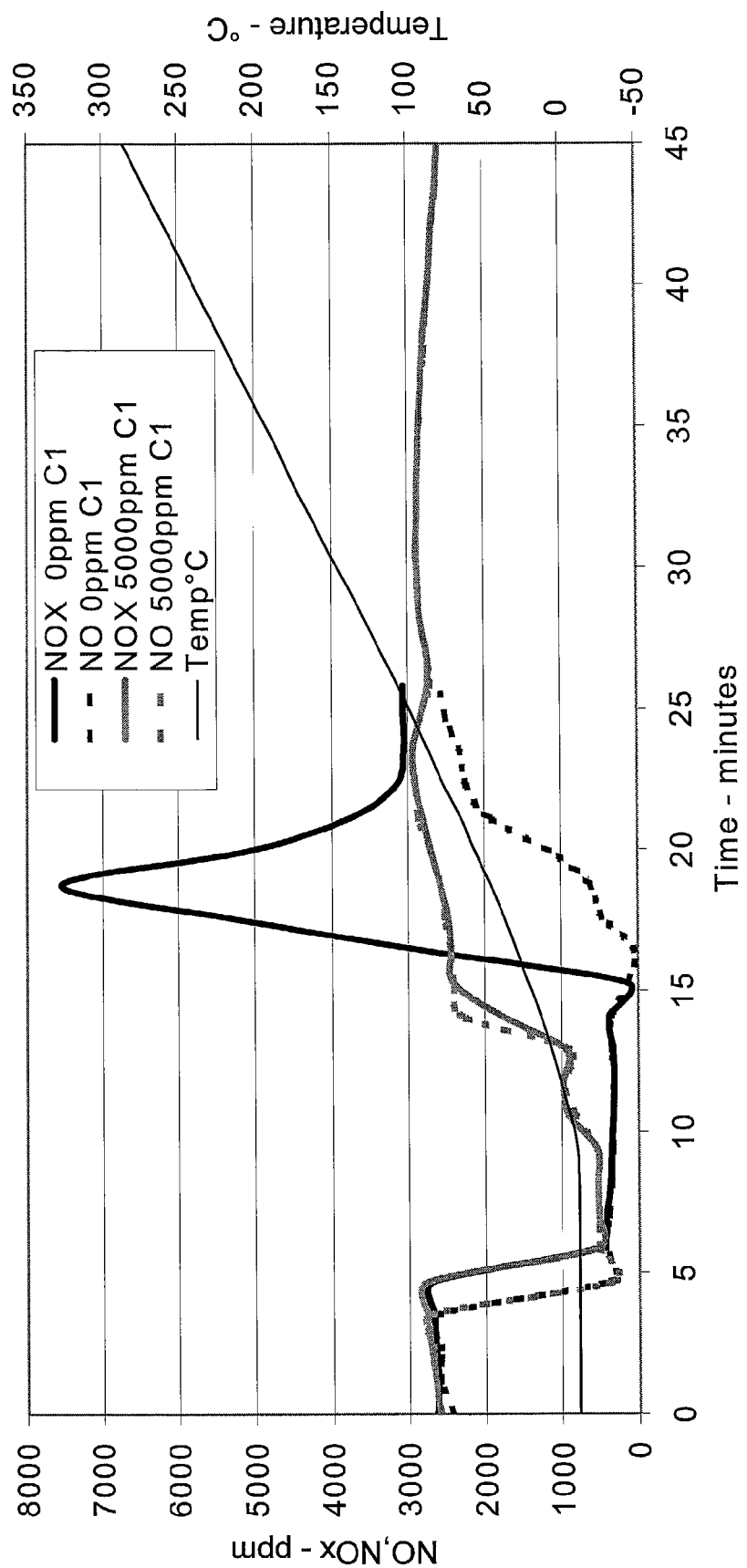
FIG. 3 is a chart showing the effect of propene on a sub-ambient adsorption/desorption of $NO_x$ on a Fe/beta zeolite catalyst.
Figure 4:
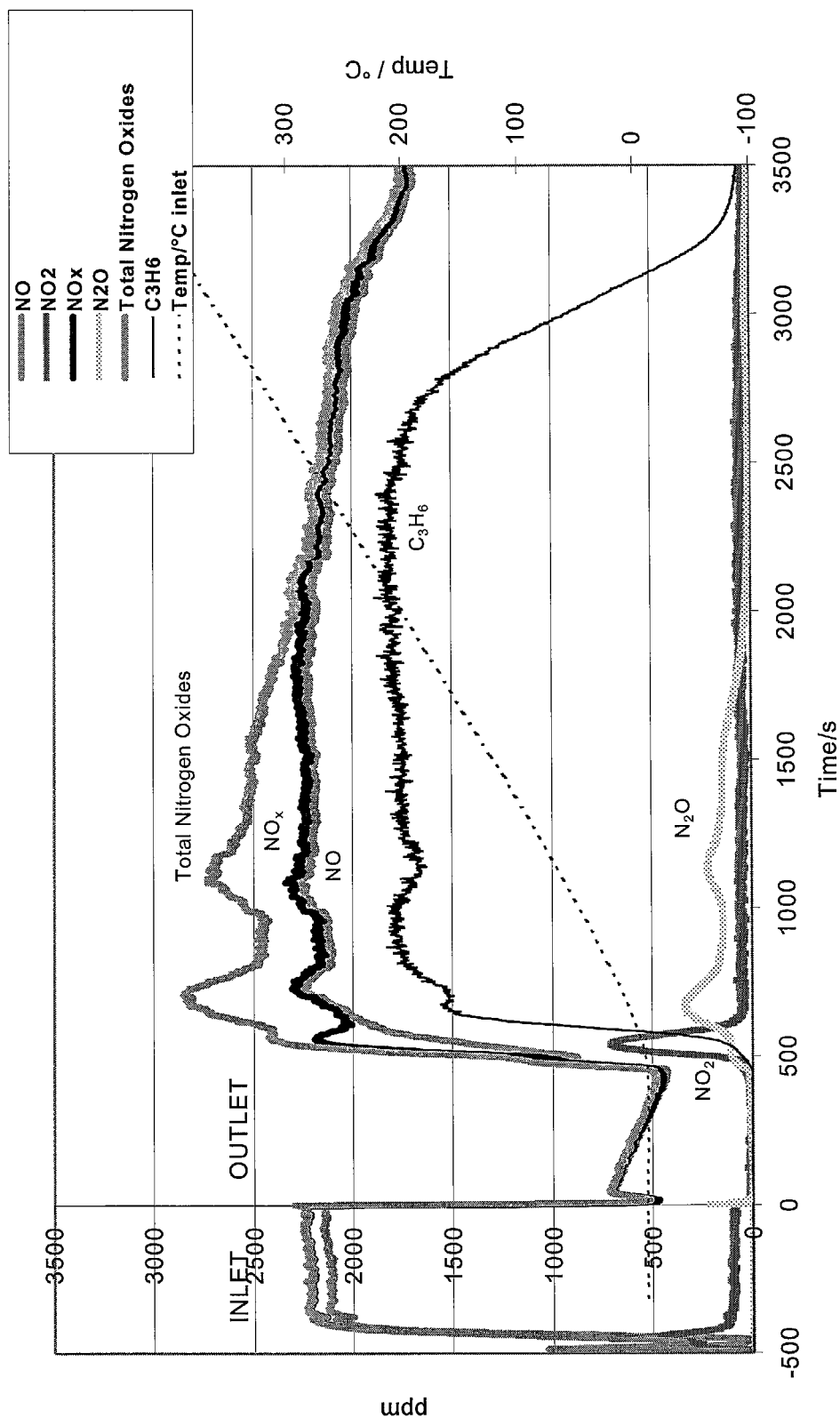
FIG. 4 is a chart showing the result of a Fourier Transform infrared (FTIR) spectroscopic analysis of a synthetic exhaust gas mixture including propene reductant exiting a Fe/beta zeolite catalyst.

It can be seen from FIG. 3 that the results obtained for the powder sample shown in FIG. 2 are repeated on the monolith. It can also be seen that in the presence of HC, $NO_x$ (NO and $NO_2$) release is suppressed on the Fe/beta elite. To determine what has become of the adsorbed NO, the composition of the exhaust gas over the course of the SCAT reactor test including propene in the feedstock was analysed using Fourier Transform Infrared Spectroscopy (FTIR) and the results are shown in FIG. 4. Total oxides of nitrogen is represented by the following components NO, $NO_2$, $N_2O$ x2 (two atoms of nitrogen present). The area below approximately 2500 ppm for total $NO_x$ from time=0 to about time=500 seconds represents net adsorption of the NO on the iron/elite catalyst, whereas the area above 2500 ppm after t=500 seconds as the temperature rises represents net desorption of $NO_x$ species.

We interpret the fact that the mass balance difference represented by these areas, i.e. total $NO_x$ adsorbed:total $NO_x$ desorbed, as evidence that HC-SCR is occurring. It can also be seen that a small amount of $N_2O$ is detected during the warm-up period which is further evidence that $NO_x$ reduction is occurring, i.e. HC-SCR. It is clear, therefore, that the $NO_x$ is converted to $N_2$.

The mass balances calculated from FIG. 4 as a percentage of total $NO_x$ storage during the adsorption phase are set out in Table 1.

TABLE 1

| As percentage of $NO_x$ storage during adsorption phase | Fe/beta |
|---|---|
| % $NO_x$ released as $NO_x$ | 6.0 |
| % $NO_x$ released as $N_2O$ | 55.9 |
| % $NO_x$ unaccounted for (presumed to be $N_2$) | 38.1 |

Example 6

Effect of Pre-Adsorption of Hydrocarbon Reductant $C_3H_6$ was adsorbed on a Fe/beta elite washcoated monolith core (15 mm diameter×30 mm long) prior to the SCAT reactor test by exposing it to $C_3H_6$ (1000 ppm $C_1$) in 12% $O_2$, 400 ppm CO, 4.5% $CO_2$, balance $N_2$ for 4 minutes at 110° C. An identical second core was prepared and exposed to the same synthetic gas for 4 minutes at 110° C., but containing also water at 4.5%. An untreated iron/beta elite core was used as a control.

Figure 5:
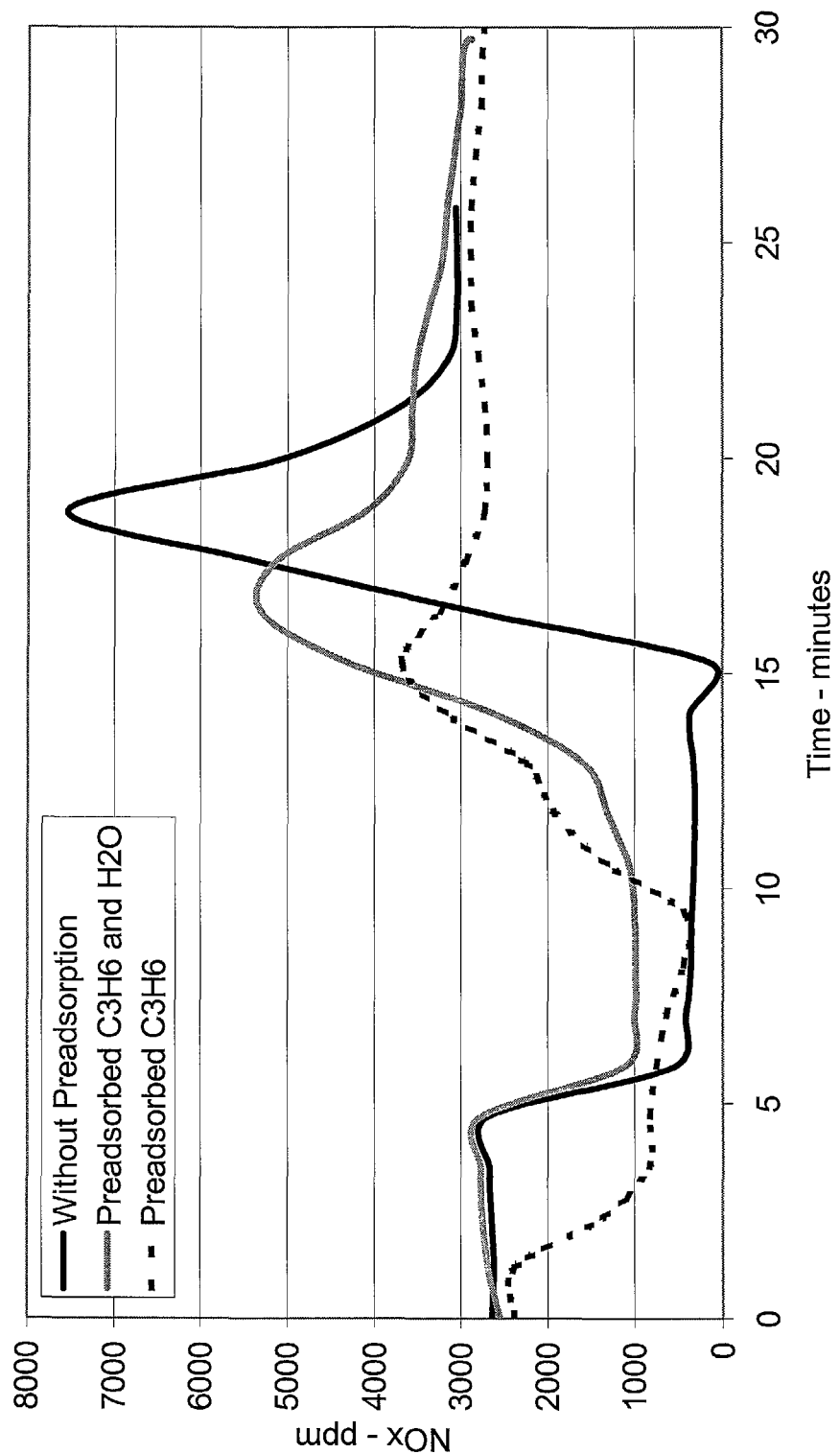
FIG. 5 is a chart showing the $NO_x$ conversion activity for an Fe/beta zeolite comparing pre-adsorption of hydrocarbon reductant and showing the effect of water on the method of the invention.

The samples were then tested in a SCAT reactor using the gas mixture and conditions outlined in Example 4, without propene present, and the results are shown in FIG. 5.

It can be seen from FIG. 5 that where no hydrocarbon is present in the feedstock, NO is adsorbed on the catalyst as seen in FIG. 3 (note reduction in the $NO_x$ content in the outlet gas from 2500 ppm NO to about 500 ppm $NO_x$), but that a spike of $NO_x$ attributable to the release of $NO_2$ is seen at 15 minutes. Where the hydrocarbon is pre-adsorbed, initial NO adsorption does not lead to a $NO_x$ spike, which is suppressed, and HC-SCR is shown to be taking place as seen in the FTIR tests shown in FIG. 4. However, it can also be seen that where $H_2O$ is pre-adsorbed on the catalyst, this leads to a moderate increase in $NO_x$ emissions and so we conclude that the presence of $H_2O$ on the catalyst can interfere with the HC-SCR process.

Example 7

Cu/beta Zeolite

Figure 6:
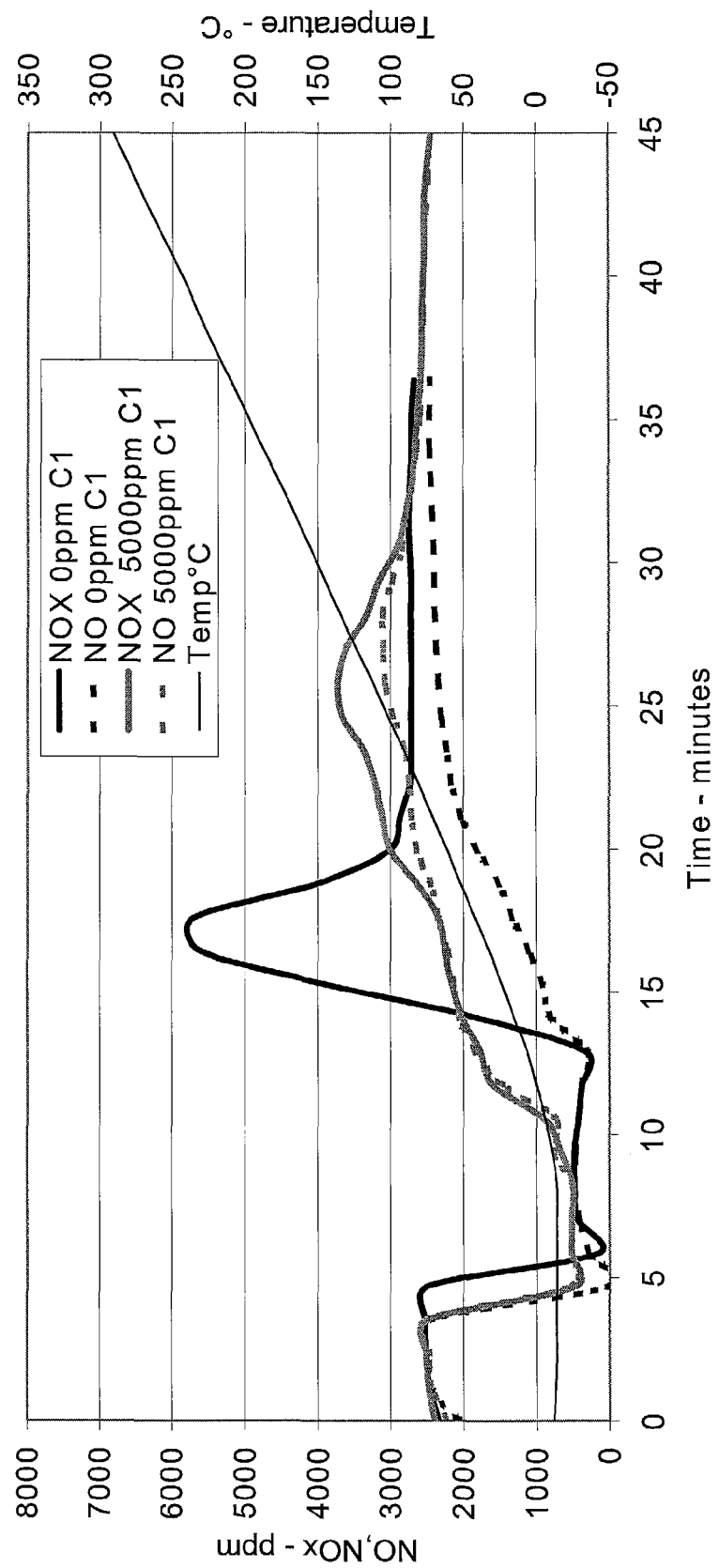
FIG. 6 is a chart showing the effect of propene on NO desorption from a Cu/beta zeolite catalyst.

Example 5 was repeated using the Cu/beta elite catalyst prepared according to Example 2. The results are shown in FIG. 6. It can be seen that, similarly to the Fe/beta elite sample, the phenomena of NO adsorption and $NO_2$ release at increased temperature are present. It can also be seen that there is some HC-SCR $NO_x$ conversion when propene is present in the feedstock, but not as much $NO_x$ conversion as in the Fe/beta elite sample. This is because there is a small, long peak above 2500 ppm NO beyond 18 minutes when the hydrocarbon is present.

Figure 7:
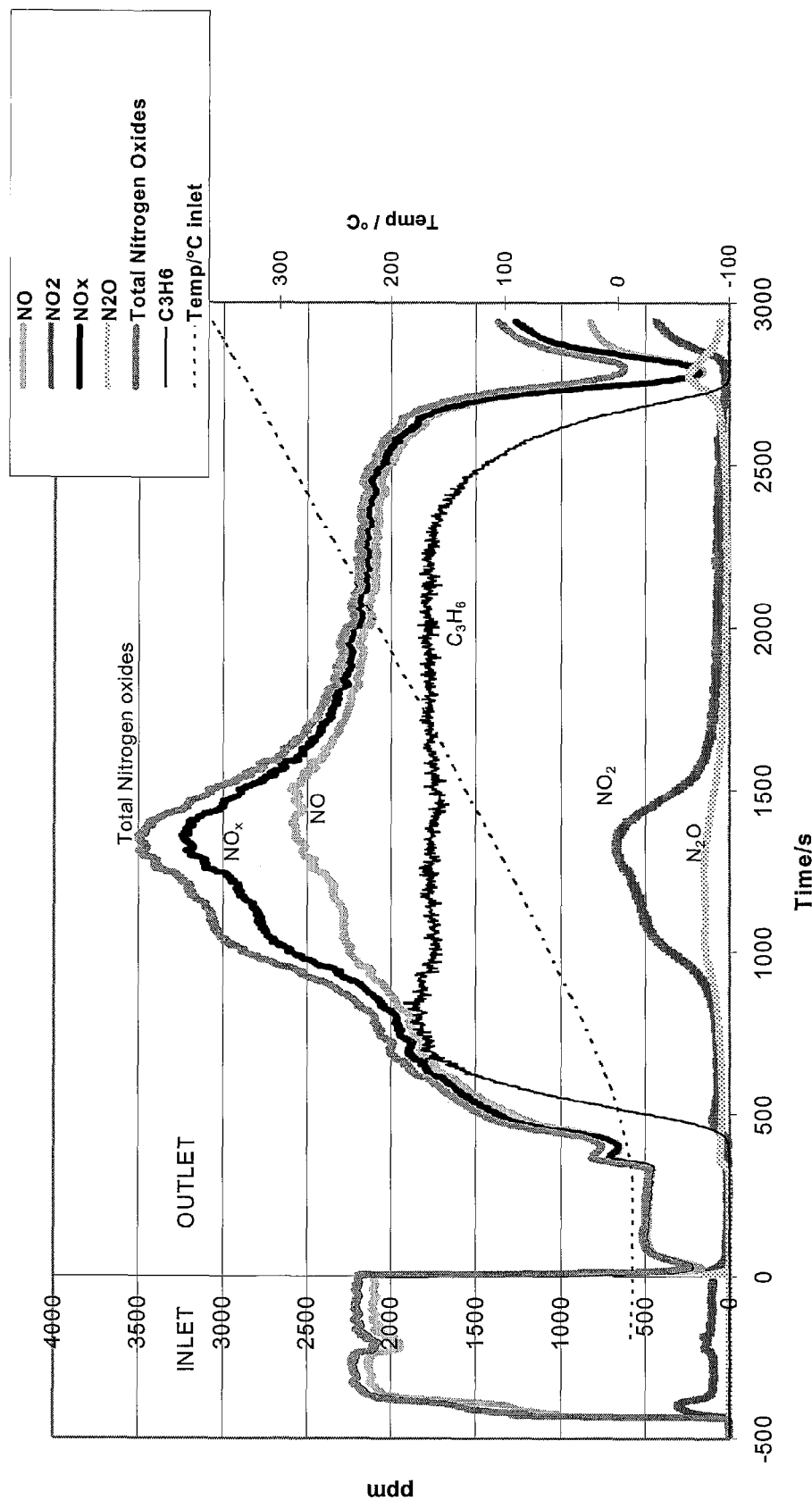
FIG. 7 is a chart showing the result of a FTIR spectroscopic analysis of the synthetic exhaust gas including propene reductant at the outlet of the Cu/beta zeolite.

An FTIR analysis of the outlet gas for the Cu/beta elite test including propene in the feedstock is shown in FIG. 7. The mass balances calculated from FIG. 7 as a percentage of total $NO_x$ storage during the adsorption phase are set out in Table 2.

TABLE 2

| As percentage of $NO_x$ storage during startup | Cu/beta |
|---|---|
| % $NO_x$ released as $NO_x$ | 54.2 |
| % $NO_x$ released as $N_2O$ | 28.4 |
| % $NO_x$ unaccounted for (presumed to be $N_2$) | 17.4 |

It can be seen by comparison with the results of Table 1 that although Cu/beta elite is active for HC-SCR, it converts less $NO_x$ than the Fe/beta elite material (17.4% NO conversion compared with at least 38% NO conversion for Fe/beta elite). This may be due to the lower SAR elite used in the Cu/beta elite catalyst. However, it is clear that at least some HC-SCR is occurring, since the Cu/beta elite is producing the signature $N_2O$.

The invention claimed is:

1. A method of reducing nitrogen oxides ($NO_x$) in a flowing combustion exhaust gas to $N_2$, which method comprising oxidising nitrogen monoxide (NO) to nitrogen dioxide ($NO_2$) on a transition metal/zeolite catalyst at temperatures below 50° C. and reducing $NO_x$ with the transition metal/zeolite catalyst using a hydrocarbon (HC) reductant introduced actively into the exhaust gas at temperatures below 150° C.,
wherein the transition metal/zeolite catalyst comprises a transition metal selected from the group consisting of cobalt, manganese, cerium, copper, iron, chromium and mixtures of any two or more thereof and a zeolite selected from the group consisting of ZSM-5, A, beta, X, Y, Linde type L and faujasite.

2. A method according to claim 1, wherein HC reductant is adsorbed on the catalyst prior to contacting the flowing combustion gas.

3. A method according to claim 1, wherein HC reductant is present in the exhaust gas at >50 ppm $C_1$ HC.

4. A method according to claim 1, wherein the $C_1$ HC:$NO_x$ molar ratio is from 30:1 to 1:1.

5. A method according to claim 1, further comprising adsorbing NO on the catalyst prior to the step of oxidising the NO to $NO_2$.

6. A method according to claim 1, wherein the transition metal is iron.

7. A method according to claim 1, wherein the zeolite is beta zeolite.

8. A method according to claim 1, wherein the combustion exhaust gas is derived from combustion of a hydrocarbon fuel in a lean-burn internal combustion engine.

9. A method according to claim 1, wherein the hydrocarbon reductant is diesel fuel.

10. A method according to claim 1 further comprising reducing $NO_x$ in the combustion exhaust gas to $N_2$ by contacting the transition metal/zeolite catalyst with a nitrogenous reductant at a temperature of ≥150° C.

11. A method according to claim 10, wherein the nitrogenous reductant is ammonia.

12. A method according to claim 10, comprising oxidising NO in the exhaust gas to $NO_2$ to produce a gas mixture comprising NO and $NO_2$ before contacting the resulting exhaust gas with the transition metal/zeolite catalyst.

13. A method according to claim 1, wherein the transition metal/zeolite catalyst comprises an Fe/beta zeolite catalyst.

14. The method according to claim 1, wherein the oxidising nitrogen monoxide (NO) to nitrogen dioxide ($NO_2$) step generates a mixture of NO:NO2 of 2:1 to 1:2.

15. A method for reducing nitrogen oxides ($NO_x$) in a flowing combustion exhaust gas to $N_2$, comprising:
oxidizing nitrogen monoxide (NO) to nitrogen dioxide ($NO_2$) on a transition metal/zeolite catalyst at temperatures below 50° C. and reducing NOx with the transition metal/zeolite catalyst using hydrocarbon (HC) reductant at temperatures below 150° C., and
switching the source of reductant from HC reductant to a nitrogenous reductant in response to a detected catalyst bed temperature of ≥150° C.,
wherein the transition metal/zeolite catalyst comprises a transition metal selected from the group consisting of cobalt, manganese, cerium, copper, iron, chromium, and mixtures of any two or more thereof and a zeolite selected from the group consisting of ZSM-5, A, beta, X, Y, Linde type L, and faujasite.

* * * * *